United States Patent
Adegawa

(10) Patent No.: US 11,245,813 B2
(45) Date of Patent: Feb. 8, 2022

(54) DOCUMENT MANAGEMENT APPARATUS FOR SCANNING IN DOCUMENTS

(71) Applicant: FUJIFILM BUSINESS INNOVATION CORP., Tokyo (JP)

(72) Inventor: Tomomichi Adegawa, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 8 days.

(21) Appl. No.: 16/820,936

(22) Filed: Mar. 17, 2020

(65) Prior Publication Data

US 2021/0092258 A1     Mar. 25, 2021

(30) Foreign Application Priority Data

Sep. 20, 2019   (JP) .............................. JP2019-171423

(51) Int. Cl.
*H04N 1/00*   (2006.01)
*H04N 1/44*   (2006.01)
*H04L 29/06*  (2006.01)

(52) U.S. Cl.
CPC ......... *H04N 1/4426* (2013.01); *H04L 63/101* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 2003/0072031 A1* | 4/2003 | Kuwata .............. | H04N 1/00204 358/1.15 |
| 2010/0262652 A1* | 10/2010 | Soga .................. | H04N 1/00204 709/203 |
| 2012/0307316 A1* | 12/2012 | De Muelenaere . | H04N 1/00222 358/444 |
| 2013/0027738 A1* | 1/2013 | Dowling .................. | H04N 1/44 358/1.14 |
| 2017/0123362 A1* | 5/2017 | Masui ................ | G03G 15/5062 |
| 2018/0183883 A1* | 6/2018 | Hashikami ............. | H04L 67/16 |

FOREIGN PATENT DOCUMENTS

| | | |
|---|---|---|
| JP | H11-143978 A | 5/1999 |
| JP | 2015-82223 A | 4/2015 |
| JP | 2016-48418 A | 4/2016 |
| JP | 2017-173914 A | 9/2017 |

* cited by examiner

*Primary Examiner* — Eric A. Rust
(74) *Attorney, Agent, or Firm* — Oliff PLC

(57) ABSTRACT

A document management support apparatus includes a processor. The processor acquires attribute information regarding a person who actually scans a paper document on behalf of a person who is to scan the paper document. The person who is to scan the paper document is a first person. The person who actually scans the paper document is a second person. The processor extracts at least one candidate for the first person from multiple candidates for the first person who each have attribute information. The at least one candidate has attribute information in a predetermined relationship with the acquired attribute information regarding the second person.

6 Claims, 14 Drawing Sheets

FIG. 6

| NAME | ID NUMBER | OCCUPATIONAL CATEGORY | BELONGING | CHARGE | OFFICE | LECTURE | THEME |
|---|---|---|---|---|---|---|---|
| ICHIRO SATO | A001 | PROFESSOR | ENGINEERING FACULTY | ELECTRICITY | BUILDING A | | |
| KAZUKO TAKAHASHI | A002 | PROFESSOR | ENGINEERING FACULTY | MECHANICAL | BUILDING A | | |
| NIKO TANAKA | A003 | PROFESSOR | SCIENCE FACULTY | PHYSICS | BUILDING B | | |
| ... | ... | ... | ... | ... | ... | | |
| JIRO SUZUKI | B001 | CLERK | ENGINEERING FACULTY | CLERICAL WORK | BUILDING A | | |
| MITSUKO ITO | B002 | CLERK | SCIENCE FACULTY | CLERICAL WORK | BUILDING B | | |
| ... | ... | ... | ... | ... | ... | | |
| SABURO KOBAYASHI | C001 | PART-TIME WORKER | PHARMACEUTICAL FACULTY | CLERICAL WORK | BUILDING C | | |
| ... | ... | ... | ... | ... | ... | | |

FIG. 14

| NAME | ID NUMBER | OCCUPATIONAL CATEGORY | BELONGING | CHARGE | OFFICE | LECTURE | THEME |
|---|---|---|---|---|---|---|---|
| ICHIRO SATO | A001 | PROFESSOR | ENGINEERING FACULTY | ELECTRICITY | BUILDING A | | |
| KAZUKO TAKAHASHI | A002 | PROFESSOR | ENGINEERING FACULTY | MECHANICAL | BUILDING A | | |
| JIRO SUZUKI | B001 | CLERK | ENGINEERING FACULTY | CLERICAL WORK | BUILDING A | | |
| ... | ... | ... | ... | ... | ... | | |

FIG. 15

| NAME | ID NUMBER | ~ | LECTURE | THEME |
|---|---|---|---|---|
| ICHIRO SATO | A001 | | SEMINAR IN CIRCUIT DESIGN | FUNDAMENTAL KNOWLEDGE ABOUT CIRCUIT |
| ICHIRO SATO | A001 | | SEMINAR IN CIRCUIT DESIGN | DIGITAL CIRCUIT |
| ICHIRO SATO | A001 | | SEMINAR IN CIRCUIT DESIGN | ANALOG CIRCUIT |
| ... | ... | | ... | ... |

DOCUMENT MANAGEMENT APPARATUS FOR SCANNING IN DOCUMENTS

CROSS-REFERENCE TO RELATED APPLICATIONS

This application is based on and claims priority under 35 USC 119 from Japanese Patent Application No. 2019-171423 filed Sep. 20, 2019.

BACKGROUND

(i) Technical Field

The present disclosure relates to a document management support apparatus, an image reading apparatus, and a non-transitory computer readable medium.

(ii) Related Art

Japanese Unexamined Patent Application Publication No. 2015-082223 discloses an information registration system including a receiving unit, an acquisition unit, and a registration controller. In the information registration system, the receiving unit receives identification information regarding a user who is to register one or more pieces of information respectively obtained from one or more paper media. The acquisition unit acquires the one or more pieces of identification information regarding respective one or more users respectively included in the one or more paper media. The registration controller controls whether the one or more pieces of information respectively obtained by the one or more paper media are registerable on the basis of the result of a comparison between the one or more pieces of identification information regarding the one or more users acquired by the acquisition unit and pieces of identification information regarding one or more users stored in association with the identification information regarding the user received by the receiving unit.

Japanese Unexamined Patent Application Publication No. 2016-048418 discloses an information processing apparatus including an acquisition unit, a designation unit, and a judgment unit. In the information processing apparatus, the acquisition unit acquires, from read information that is read from a paper medium, handwritten identification character-string information that is information regarding a character string for identifying a user that is handwritten by the user. By using the character string represented by the handwritten identification character-string information, the designation unit designates at least one piece of registered identification character-string information from among pieces of registered identification character-string information that are pieces of information regarding character strings for respectively identifying users registered in advance. By using the result of a comparison between the information regarding the character string that is handwritten by the user and that is acquired from the read information and information regarding a character string handwritten by a user that is included in related information stored in a memory in association with the designated registered identification character-string information, the judgment unit judges whether to associate the read information with the designated registered identification character-string information.

SUMMARY

In a case where a paper document (for example, a test or a thesis) to be scanned by a first person (for example, a teacher) is to be registered in association with the first person, a second person (for example, a clerk) sometimes actually scans the paper document. At this time, the second person needs to identify the first person to be associated with the scanned paper document from all of candidates likely to be the first person (for example, all teachers).

Aspects of non-limiting embodiments of the present disclosure relate to a document management support apparatus, an image reading apparatus, and a non-transitory computer readable medium each of which is enabled to reduce an effort to identify a first person when the first person is to scan a paper document but when a second person actually scans the paper document on behalf of the first person, as compared with a case where the first person is identified from all of candidates likely to be the first person.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a document management support apparatus including a processor. The processor acquires attribute information regarding a person who actually scans a paper document on behalf of a person who is to scan the paper document. The person who is to scan the paper document is a first person. The person who actually scans the paper document is a second person. The processor extracts at least one candidate for the first person from multiple candidates for the first person who each have attribute information. The at least one candidate has attribute information in a predetermined relationship with the acquired attribute information regarding the second person.

BRIEF DESCRIPTION OF THE DRAWINGS

Exemplary embodiments of the present disclosure will be described in detail based on the following figures, wherein:

FIG. 6 illustrates the content of a database of Exemplary Embodiment 1;

FIG. 14 illustrates extracted candidates in Exemplary Embodiment 1;

FIG. 15 illustrates extracted candidates in Exemplary Embodiment 2;

DETAILED DESCRIPTION

Exemplary Embodiment 1

Configuration of Learning Management System

Hereinafter, an exemplary embodiment of a learning management system including an image reading apparatus according to the present disclosure will be described.

Figure 1:
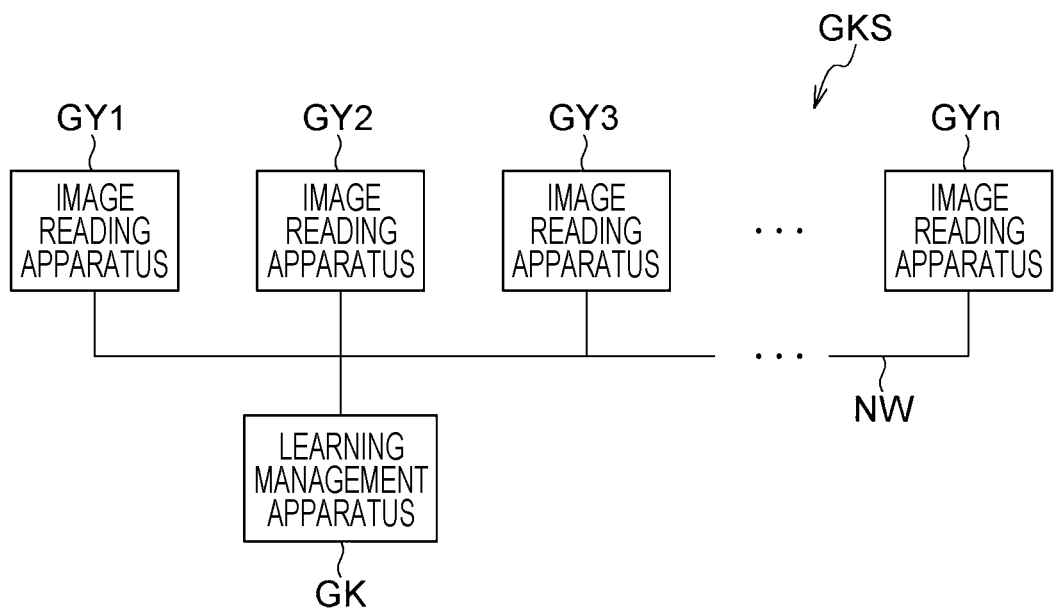
FIG. 1 illustrates the configuration of a learning management system of Exemplary Embodiment 1.

FIG. 1 illustrates the configuration of the learning management system of Exemplary Embodiment 1.

Hereinafter, the learning management system of Exemplary Embodiment 1 will be described with reference to FIG. 1.

As illustrated in FIG. 1, a learning management system GKS of Exemplary Embodiment 1 includes multiple image reading apparatuses GY1 to GYn (n is an integer of 2 or larger), a learning management apparatus GK, and a network NW. For easier explanation and understanding, the term "image reading apparatus GY" is used as a general term for the image reading apparatuses GY1 to GYn.

Configuration of Image Reading Apparatus

Figure 2:
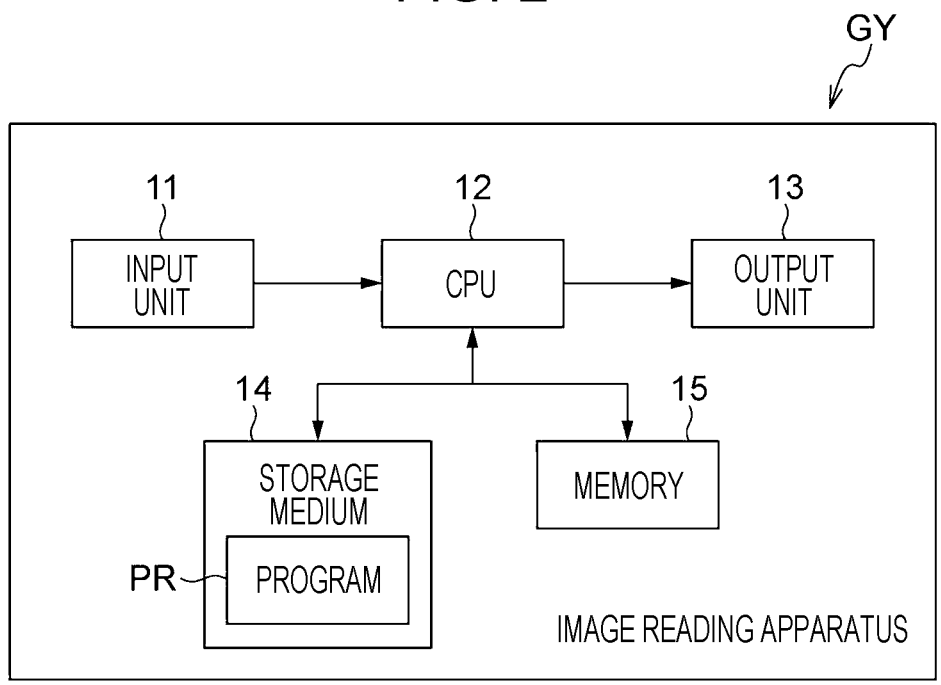
FIG. 2 illustrates the configuration of an image reading apparatus of Exemplary Embodiment 1.

FIG. 2 illustrates the configuration of an image reading apparatus of Exemplary Embodiment 1.

As illustrated in FIG. 2, the image reading apparatus GY of Exemplary Embodiment 1 includes an input unit 11, a central processing unit (CPU) 12, an output unit 13, a storage medium 14, and a memory 15. The input unit 11 is composed of, for example, a touch panel and a contactless IC card unit. The CPU 12 is an example of a processor and is well known as the nucleus of a computer that causes hardware to operate in accordance with software. The output unit 13 is composed of, for example, a liquid crystal monitor, a printer, and a speaker. The storage medium 14 is composed of, for example, a hard disk drive (HDD), a solid state drive (SSD), or a read only memory (ROM). The storage medium 14 stores therein a program PR. The program PR serves as language bundles that specify the content of processing to be performed by the image reading apparatus GY. The memory 15 is composed of, for example, a dynamic random access memory (DRAM) and a static random access memory (SRAM).

Figure 3:
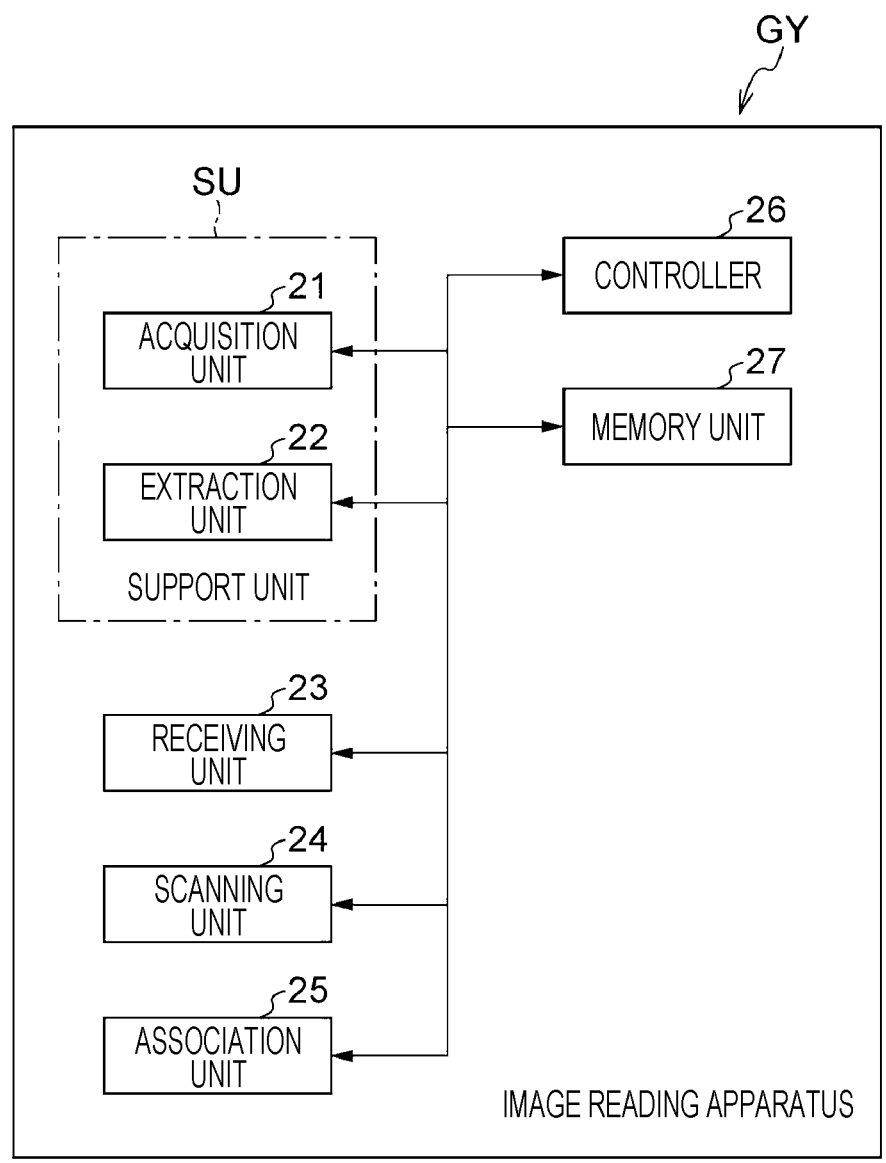
FIG. 3 is a functional block diagram of the image reading apparatus of Exemplary Embodiment 1.

FIG. 3 is a functional block diagram of the image reading apparatus of Exemplary Embodiment 1.

As illustrated in FIG. 3, the image reading apparatus GY includes an acquisition unit 21, an extraction unit 22, a receiving unit 23, a scanning unit 24, an association unit 25, a controller 26, and a memory unit 27. The acquisition unit 21 and the extraction unit 22 form a support unit SU that is an example of a document management support apparatus.

In the relationship between the hardware configuration of the image reading apparatus GY and the functional configuration thereof, the CPU 12 as the hardware runs the program PR stored in the storage medium 14 (corresponding to the memory unit 27) by using the memory 15 (corresponding to the memory unit 27) and also controls the operation of the input unit 11 and the output unit 13 as necessary, and thereby the functions of the acquisition unit 21, the extraction unit 22, the receiving unit 23, the scanning unit 24, the association unit 25, and the controller 26 are implemented. The functions of the components are described later.

Configuration of Learning Management Apparatus

Figure 4:
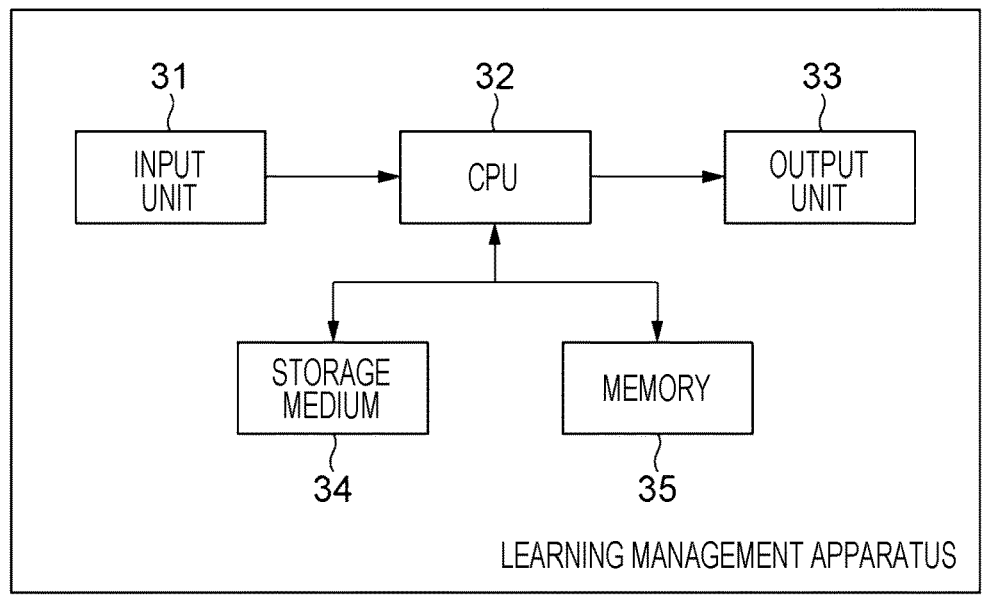
FIG. 4 illustrates the configuration of a learning management apparatus of Exemplary Embodiment 1.

FIG. 4 illustrates the configuration of a learning management apparatus of Exemplary Embodiment 1.

As illustrated in FIG. 4, the learning management apparatus GK of Exemplary Embodiment 1 includes an input unit 31, a CPU 32, an output unit 33, a storage medium 34, and a memory 35. The input unit 31 is composed of, for example, a touch panel, a keyboard, and a mouse. The CPU 32 is an example of the processor and is well known as the nucleus of a computer that causes hardware to operate in accordance with software, like the above-described CPU 12 of the image reading apparatus GY. The output unit 33 is composed of, for example, a touch panel and a printer. The storage medium 34 is composed of, for example, a HDD, a SSD, or a ROM, like the above-described storage medium 14 of the image reading apparatus GY. The memory 35 is composed of, for example, a DRAM and a SRAM, like the above-described memory 15 of the image reading apparatus GY.

Figure 5:
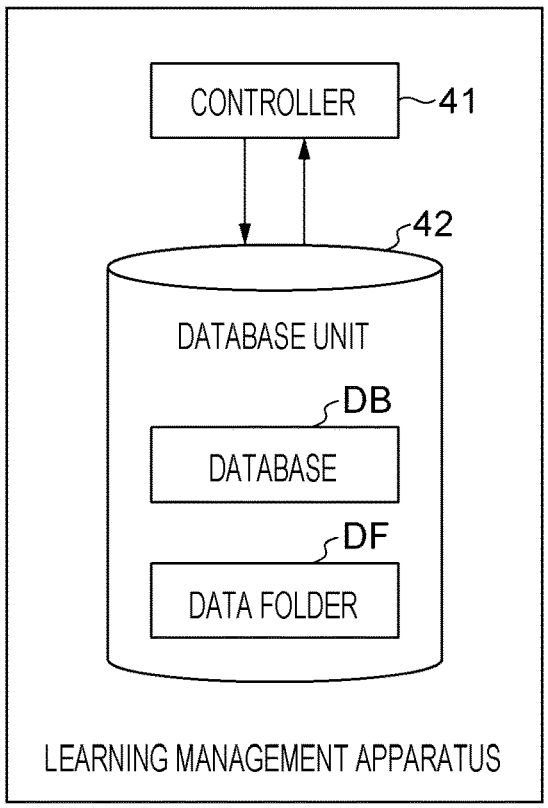
FIG. 5 is a functional block diagram of the learning management apparatus of Exemplary Embodiment 1.

FIG. 5 is a functional block diagram of the learning management apparatus of Exemplary Embodiment 1.

As illustrated in FIG. 5, the learning management apparatus GK includes a controller 41 and a database unit 42. As illustrated in FIG. 5, the database unit 42 stores a database DB and a data folder DF.

FIG. 6 illustrates the content of the database DB of Exemplary Embodiment 1.

As illustrated in FIG. 6, the database DB stores attribute information ZJ composed of attributes Z that are Name, identification (ID) Number, Occupational Category, Belonging, Charge, Office, Lecture, Theme, and the like regarding all of staff members of ABC University such as professors, clerks, and part-time workers who use the learning management system GKS (illustrated in FIG. 1). ID Number is an example of individual identification. All of the staff members of ABC University are candidates for a person to be associated with a document DC (illustrated in FIG. 8) as to be described later.

For example, regarding the staff member Ichiro Sato, the database DB stores values that are Ichiro Sato, A001, Professor, Engineering Faculty, Electricity, and Building A, respectively, for the attributes Z that are Name, ID Number, Occupational Category, Belonging, Charge, and Office. In addition, regarding the staff member Jiro Suzuki, the database DB stores values that are Jiro Suzuki, B001, Clerk, Engineering Faculty, Clerical Work, and Building A, respectively, for the attributes Z that are Name, ID Number, Occupational Category, Belonging, Charge, and Office.

Figure 7:
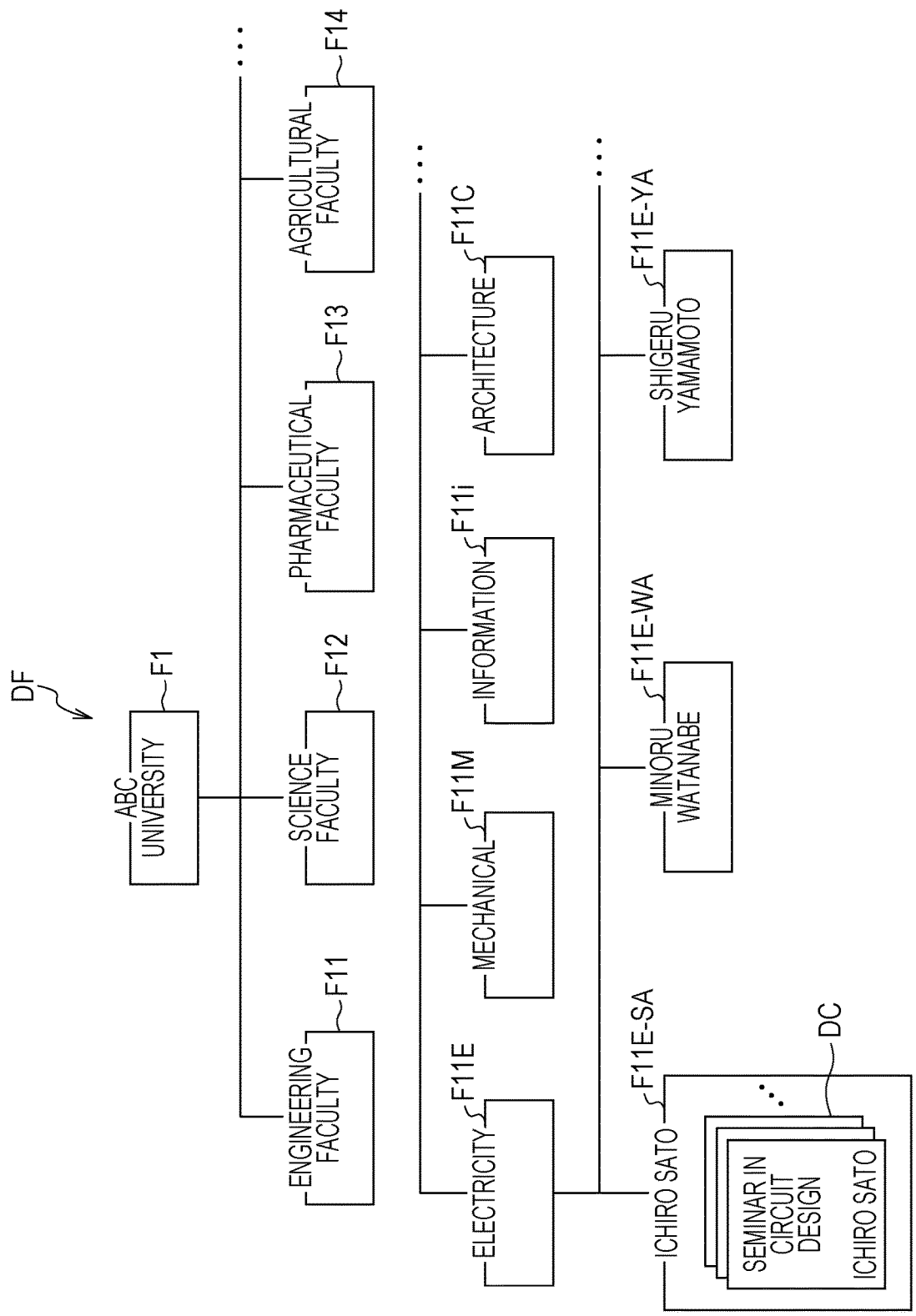
FIG. 7 illustrates the configuration of a data folder in Exemplary Embodiment 1.

FIG. 7 illustrates the configuration of the data folder DF in Exemplary Embodiment 1.

As illustrated in FIG. 7, the data folder DF has a tree structure. A folder F1 in the highest layer is a folder for ABC University. Folders F11, F12, F13, and F14 immediately below the folder F1 are folders for Engineering Faculty, Science Faculty, Pharmaceutical Faculty, and Agricultural Faculty, respectively. Further, for example, folders F11E, F11M, F11i, and F11C immediately below the folder F11 are folders for Electrical Engineering Department, Mechanical Engineering Department, Information Engineering Department, and Architectural Engineering Department, respectively. Further, for example, folders F11E-SA, F11E-WA, and F11E-YA immediately below the folder F11E are folders for Ichiro Sato (illustrated in FIG. 6), Minoru Watanabe, and Shigeru Yamamoto, respectively.

Figure 8:
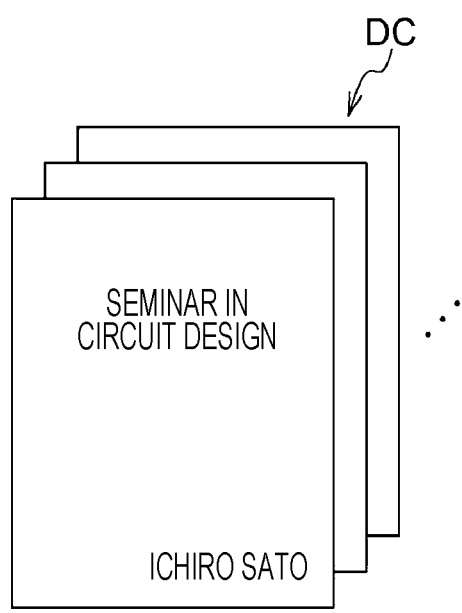
FIG. 8 illustrates a document to be scanned in Exemplary Embodiment 1.

FIG. 8 illustrates a document to be scanned in Exemplary Embodiment 1.

The document DC is a paper medium having printed and handwritten characters. More specifically, the document DC includes the words of questions in a homework or an examination provided by the professor Ichiro Sato, for example, the words of questions for Seminar in Circuit Design as Lecture that is one of the attributes Z and answers written by a student. The learning management system GKS needs to be designed to enable the student to access the folder F11E-SA for the professor Ichiro Sato (illustrated in FIG. 7) and thereby to read the document DC proofread and marked by the professor Ichiro Sato. The document DC thus needs to be stored in the folder F11E-SA for Ichiro Sato after the proofreading or the like by the professor Ichiro Sato. In other words, the document DC and the professor Ichiro Sato need to be associated with each other. The details will be described later.

Referring back to FIGS. 4 and 5, in the relationship between the hardware configuration of the learning management apparatus GK and the functional configuration thereof, the CPU 32 as the hardware runs a program (not illustrated) stored in the storage medium 34, and access to the database DB and the data folder DF in the database unit 42 by the controller 41, access to the database DB and the data folder DF in the database unit 42 by the image reading apparatus GY via the network NW, and the like are thereby achieved.

Referring back to FIG. 1, the network NW connects the image reading apparatuses GY1 to GYn and the learning management apparatus GK. The network NW is, for example, any of an intranet and the Internet. The network NW is also any of a wired network and a wireless network.

ID Card for Image Reading Apparatus

Figure 9:
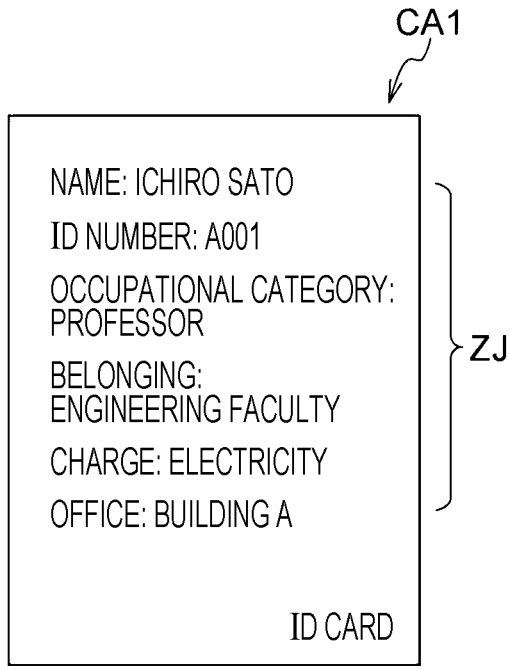
FIG. 9 illustrates an example ID card for Exemplary Embodiment 1.
Figure 10:
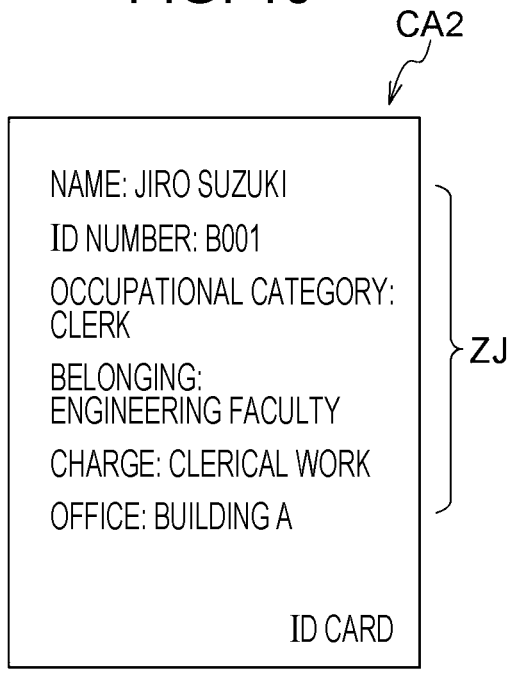
FIG. 10 illustrates another example ID card for Exemplary Embodiment 1.

FIGS. 9 and 10 respectively illustrate ID cards for using an image reading apparatus.

ID cards CA1 and CA2 respectively illustrated in FIGS. 9 and 10 are contactless IC cards. The ID cards CA1 and CA2 are respectively used when the staff member Ichiro Sato and the staff member Jiro Suzuki use the image reading apparatus GY.

Each of the ID cards CA1 and CA2 stores the attribute information ZJ for a corresponding one of the staff member Ichiro Sato and the staff member Jiro Suzuki. In more detail, as illustrated in FIG. 9, the ID card CA1 of the staff member Ichiro Sato stores the attribute information ZJ having values of Ichiro Sato for Name, A001 for ID Number, Professor for Occupational Category, Engineering Faculty for Belonging, Electricity for Charge, and Building A for Office. The attribute information ZJ regarding the staff member Ichiro Sato (illustrated in FIG. 9) stored in the ID card CA1 is identical to the attribute information ZJ regarding the staff member Ichiro Sato (illustrated in FIG. 6) stored in the database DB.

As illustrated in FIG. 10, the ID card CA2 of the staff member Jiro Suzuki stores the attribute information ZJ having values of Jiro Suzuki for Name, B001 for ID Number, Clerk for Occupational Category, Engineering Faculty for Belonging, Clerical Work for Charge, and Building A for Office. The attribute information ZJ regarding the staff member Jiro Suzuki (illustrated in FIG. 10) stored in the ID card CA2 is identical to the attribute information ZJ regarding the staff member Jiro Suzuki (illustrated in FIG. 6) stored in the database DB.

Operation of Learning Management System

The operation of the learning management system of Exemplary Embodiment 1 will be described.

Figure 11:
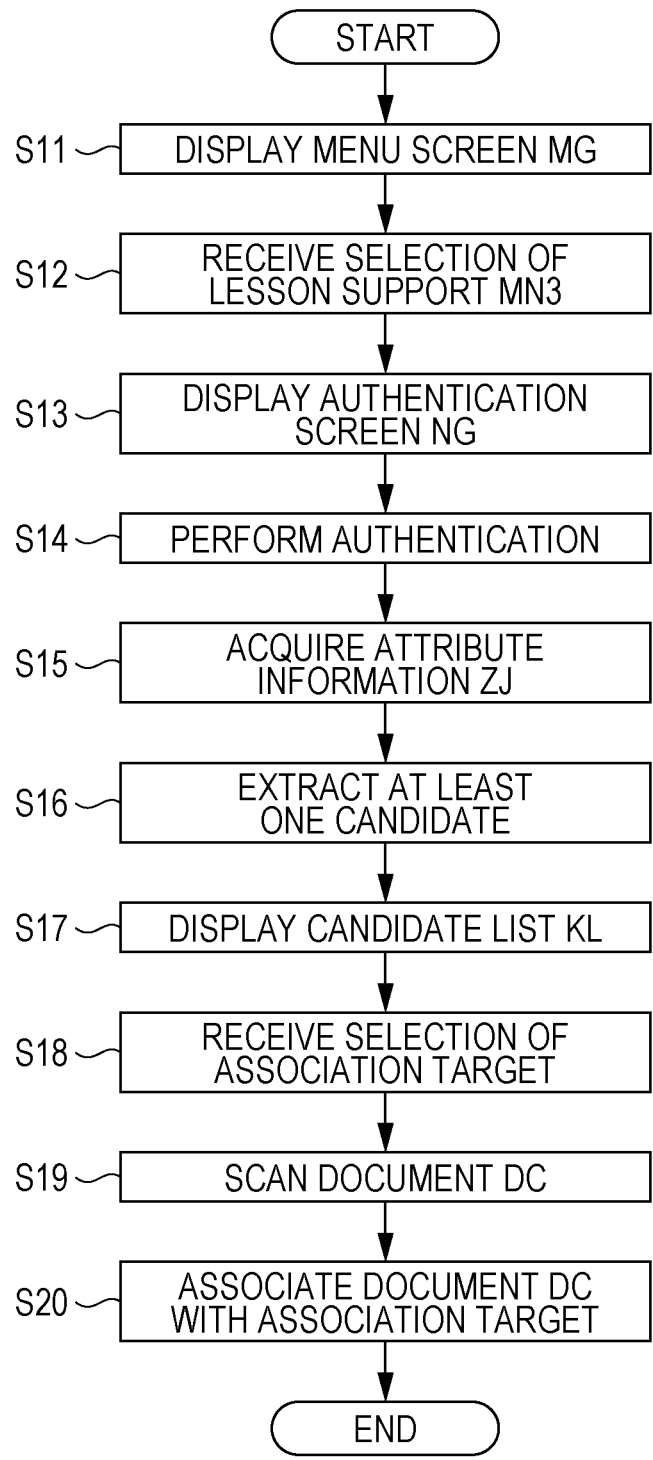
FIG. 11 is a flowchart illustrating the operation of the learning management system of Exemplary Embodiment 1.

FIG. 11 is a flowchart illustrating the operation of the learning management system of Exemplary Embodiment 1. Hereinafter, the operation of the learning management system of Exemplary Embodiment 1 will be described with reference to the flowchart in FIG. 11.

The following description assumes that Jiro Suzuki having the value Clerk for Occupational Category as the attribute Z uses the image reading apparatus GY3 (illustrated in FIG. 1) by using the ID card CA2 (illustrated in FIG. 10) of Jiro Suzuki himself and associates the document DC (illustrated in FIG. 8) of Ichiro Sato having the value Professor for Occupational Category as the attribute Z with Ichiro Sato on behalf of Ichiro Sato, that is, stores the document DC in the folder F11E-SA for Ichiro Sato in the data folder DF (illustrated in FIG. 7) in the database unit 42 of the learning management apparatus GK. Note that Ichiro Sato is an example of a first person who is to scan a paper document.

Figure 12:
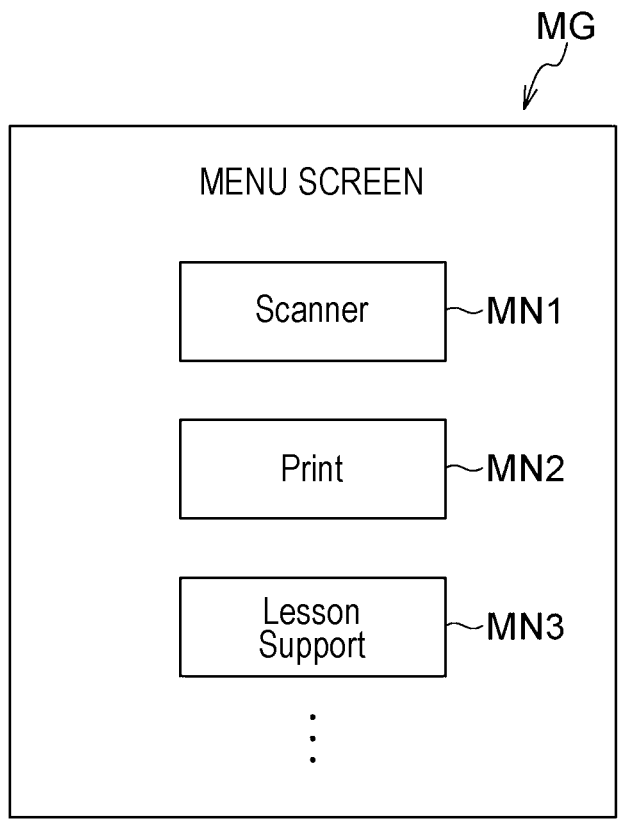
FIG. 12 illustrates a menu screen of Exemplary Embodiment 1.

Step S11: When Jiro Suzuki touches, for example, the touch panel of the input unit 11 of the image reading apparatus GY3, the CPU 12 of the image reading apparatus GY3 causes the output unit 13, for example, the touch panel to display a menu screen MG, as illustrated in FIG. 12. As illustrated in FIG. 12, functions of the image reading apparatus GY3 are displayed on the menu screen MG, and a menu representing, for example, Scanner MN1, Print MN2, and Lesson Support MN3 is displayed thereon.

Step S12: After the menu screen MG is displayed in step S11, Jiro Suzuki selects Lesson Support MN3 from the displayed menu screen MG. In the image reading apparatus GY3, the CPU 12 thus receives the selection of Lesson Support MN3, serving as the receiving unit 23.

Figure 13:
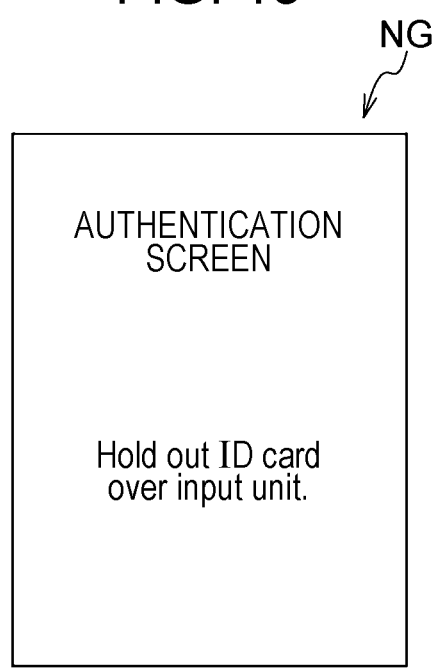
FIG. 13 illustrates an authentication screen of Exemplary Embodiment 1.

Step S13: After receiving the selection of Lesson Support MN3 in step S12, the CPU 12 causes the output unit 13 to display an authentication screen NG. As illustrated in FIG. 13, for example, the message "Hold ID card out over input unit." is displayed on the authentication screen NG.

Step S14: After the authentication screen NG is displayed in step S13, Jiro Suzuki holds out the ID card CA2 (illustrated in FIG. 10) over the input unit 11, for example, a contactless IC card unit, of the image reading apparatus GY3 in accordance with the message on the authentication screen NG. In the image reading apparatus GY3, the CPU 12 thus authenticates the person who intends to use the image reading apparatus GY3 as a person authorized to use the image reading apparatus GY3.

Step S15: After completing the authentication in step S14, the CPU 12 in the image reading apparatus GY3 serves as the acquisition unit 21 in the support unit SU and acquires the attribute information ZJ regarding Jiro Suzuki from the ID card CA2 while the ID card CA2 is being over the input unit 11.

Step S16: After acquiring the attribute information ZJ regarding Jiro Suzuki in step S15, the CPU 12 in the image reading apparatus GY3 serves as the extraction unit 22 in the support unit SU and accesses the database DB stored in the database unit 42 in the learning management apparatus GK via the network NW. The CPU 12 thus searches all of the staff members of ABC University stored in the database DB (illustrated in FIG. 6) for a staff member having a predetermined relationship with the attribute information ZJ regarding Jiro Suzuki acquired from the ID card CA2, for example, for one or more staff members having attribute information ZJ in a relationship in which a value for Belonging as an attribute Z included in the attribute information ZJ regarding Jiro Suzuki, that is, the value Engineering Faculty is identical to a value of the one or more staff members. As illustrated in FIG. 14, the CPU 12 thus extracts at least one candidate for a person to be associated with the document DC, that is, the staff member Ichiro Sato, the staff member Kazuko Takahashi, the staff member Jiro Suzuki, and . . . , serving as the extraction unit 22. Note that the at least one candidate for a person to be associated with the document DC is an example of at least one candidate for a first person.

Step S17: After extracting the above-described candidates in step S16, the CPU 12 in the image reading apparatus GY3 causes the output unit 13 to display a candidate list KL (illustrated in FIG. 14) that is a list of candidates who are the staff member Ichiro Sato, the staff member Kazuko Takahashi, the staff member Jiro Suzuki, and . . . , for example, on the touch panel.

Step S18: After the candidate list KL is displayed in step S17, Jiro Suzuki selects the staff member Ichiro Sato to be associated with the document DC (illustrated in FIG. 8) from the candidate list KL by using the input unit 11, for example, the touch panel. In the image reading apparatus GY3, the CPU 12 thus regards, as an association target to be associated with the document DC, Ichiro Sato selected by Jiro Suzuki and receives the association target, serving as the receiving unit 23.

Step S19: After the receiving of the staff member Ichiro Sato as the association target is completed in step S18, Jiro Suzuki who is Clerk scans the document DC (illustrated in FIG. 8) of Ichiro Sato who is Professor with the image reading apparatus GY3. In other words, in the image reading apparatus GY3, the CPU 12 serves as the scanning unit 24 and scans, that is, reads the document DC of Ichiro Sato who is Professor.

Step S20: After the scanning of the document DC is completed in step S19, the CPU 12 in the image reading apparatus GY3 serves as the association unit 25 and associates the attribute information ZJ regarding Ichiro Sato selected in step S18 with the document DC scanned in step S19. In more detail, as illustrated in FIG. 7, the CPU 12 stores the scanned document DC in the folder F11E-SA for Ichiro Sato in the data folder DF in the database unit 42 of the learning management apparatus GK.

After step S20 described above, the student who takes the class of Ichiro Sato who is Professor accesses the folder F11E-SA after submitting the document DC, for example, a homework or an examination and thereby reads the proofreading, the marking, the review, or the like of the homework submitted or the examination taken by the student themselves.

As described above, in the learning management system GKS of Exemplary Embodiment 1, the CPU 12 of the image reading apparatus GY3 serves as the acquisition unit 21 and acquires the attribute information ZJ regarding Jiro Suzuki from the ID card CA2 of Jiro Suzuki using the image reading apparatus GY3. The CPU 12 of the image reading apparatus GY3 also serves as the extraction unit 22 and extracts the at least one candidate, that is, the staff member Ichiro Sato, the staff member Kazuko Takahashi, the staff member Jiro Suzuki, and . . . who in common have a value for Belonging as an attribute Z included in the attribute information ZJ regarding Jiro Suzuki, that is, Engineering Faculty. The CPU 12 extracts the at least one candidate from the database DB including respective pieces of attribute information ZJ regarding all of the staff members of ABC University stored in the database unit 42 of the learning management apparatus GK. In other words, the CPU 12 narrows down the staff members. Further, in the image reading apparatus GY, the output unit 13 displays the candidate list KL having the extracted candidates Ichiro Sato, Kazuko Takahashi, Jiro Suzuki, and . . . . This makes it easier for Jiro Suzuki using the image reading apparatus GY3 to identify the staff member Ichiro Sato than in the case where the staff member Ichiro Sato to be associated with the document DC is found from all of the staff members of ABC University.

Modification

Instead of using Belonging as the attribute Z in every extraction regardless of the attribute information ZJ regarding the person using the image reading apparatus GY3 as described with reference to step S16 above, a different attribute Z may be used in extraction, depending on the attribute information ZJ regarding the person using the image reading apparatus GY3. For example, instead of using Belonging as the attribute Z in every extraction regardless of whether the value for Occupational Category as the attribute Z of the person using the image reading apparatus GY3 is Clerk or Part-time Worker, a different attribute Z may be used depending on the value for Occupational Category as the attribute Z of the person using the image reading apparatus GY3. More specifically, when the value for Occupational Category as the attribute Z (illustrated in FIG. 6) of the user of the image reading apparatus GY3 who is Mitsuko Ito is Clerk, the extraction may be performed by using a value for Belonging as the attribute Z, that is, Science Faculty, like the exemplary embodiment. In contrast, when the value for Occupational Category as the attribute Z (illustrated in FIG. 6) of the user who is Saburo Kobayashi is Part-time Worker, the extraction may be performed by using a value for Office as the attribute Z, that is, Building C, unlike the above-described exemplary embodiment.

Exemplary Embodiment 2

A learning management system of Exemplary Embodiment 2 will be described.

Configuration of Exemplary Embodiment 2

A learning management system GKS of Exemplary Embodiment 2 has the same configuration as the configuration of the learning management system GKS of Exemplary Embodiment 1 illustrated in FIG. 1.

Candidate List of Exemplary Embodiment 2

FIG. 15 illustrates candidates extracted in Exemplary Embodiment 2.

Unlike Exemplary Embodiment 1 having blank fields for Lecture and Theme as the attributes Z in the attribute information ZJ in the database DB (illustrated in FIG. 6), for example, the value Seminar in Circuit Design is specified for Lecture as the attribute Z, and the value Fundamental Knowledge about Circuit and other values (not illustrated) for Theme as the attribute Z are specified in Exemplary Embodiment 2. As the result, unlike the candidate list KL of Exemplary Embodiment 1 illustrated in FIG. 14, a candidate list KL of Exemplary Embodiment 2 may include, as illustrated in FIG. 15, pieces of attribute information ZJ regarding, for example, the staff member Ichiro Sato in which respective values for Lecture and Theme are (1) Seminar in Circuit Design and Fundamental Knowledge about Circuit; (2) Seminar in Circuit Design and Digital Circuit; and (3) Seminar in Circuit Design and Analog Circuit.

Document for Exemplary Embodiment 2

Figure 16:
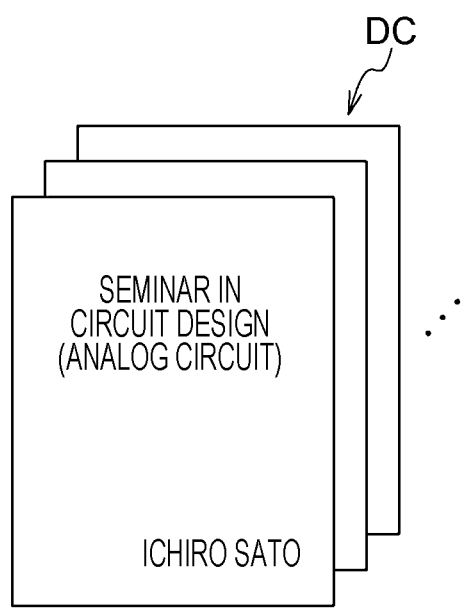
FIG. 16 illustrates a document to be scanned in Exemplary Embodiment 2.

FIG. 16 illustrates a document to be scanned in Exemplary Embodiment 2.

In a document DC in Exemplary Embodiment 2, the value Seminar in Circuit Design is specified for Lecture that is one of the attributes Z, like the document DC for Exemplary Embodiment 1 (illustrated in FIG. 8), while the value Analog Circuit is specified for Theme that is one of the attributes Z, unlike the document DC for Exemplary Embodiment 1.

Data Folder in Exemplary Embodiment 2

Figure 17:
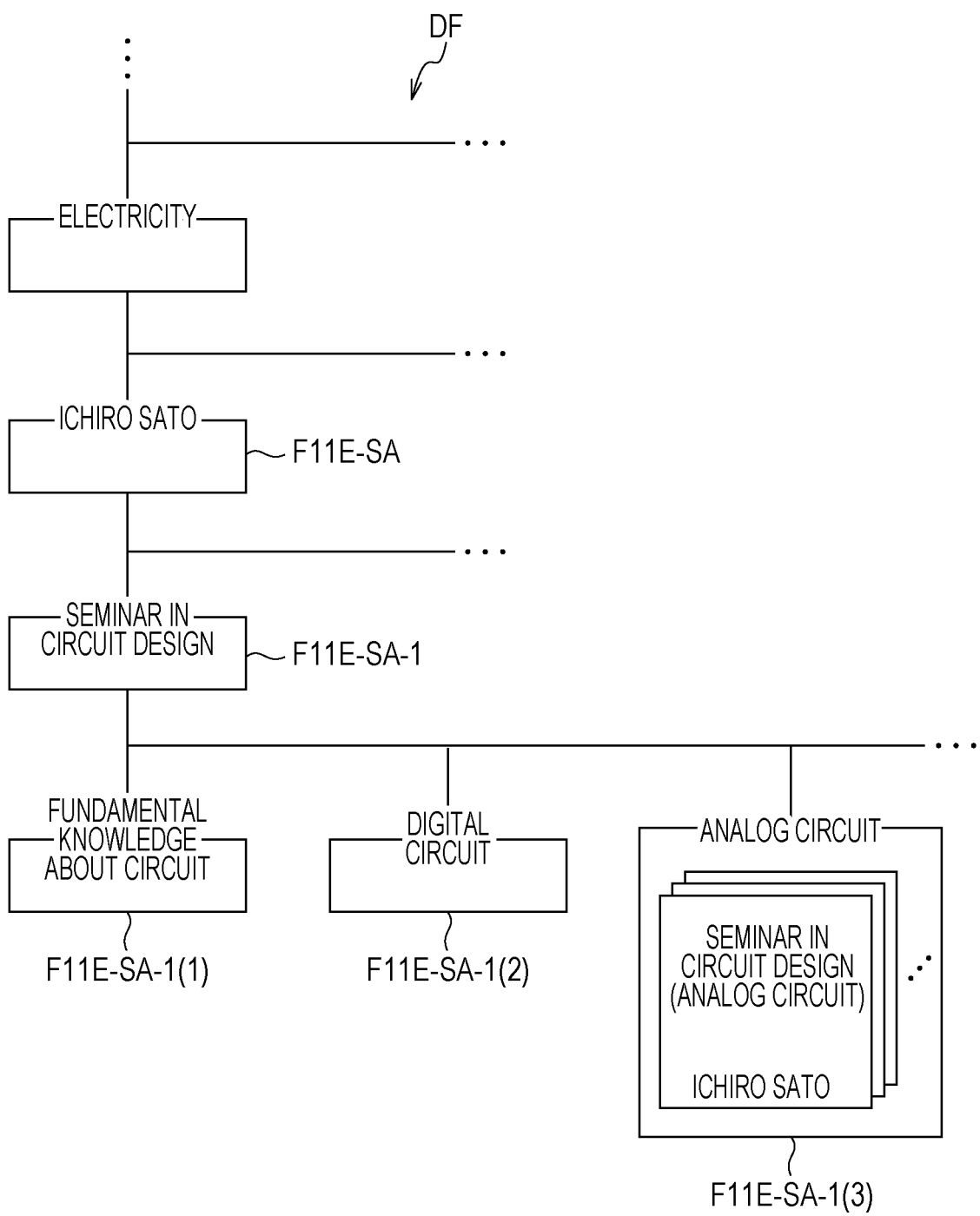
FIG. 17 illustrates the configuration of a data folder in Exemplary Embodiment 2.

FIG. 17 illustrates the configuration of a data folder in Exemplary Embodiment 2.

In a data folder DF in Exemplary Embodiment 2, unlike the data folder DF in Exemplary Embodiment 1 (illustrated in FIG. 7), as illustrated in FIG. 17, the folder F11E-SA-1 for Lecture that is one of the attributes Z, that is, for the value Seminar in Circuit Design is provided immediately below the folder F11-SA for the staff member Ichiro Sato. Further, in the data folder DF in Exemplary Embodiment 2, the folder F11E-SA-1(1) for Fundamental Knowledge about Circuit, the folder F11E-SA-1(2) for Digital Circuit, and the folder F11E-SA-1(3) for Analog Circuit are provided immediately below the folder F11E-SA-1 for Seminar in Circuit Design.

Operation of Exemplary Embodiment 2

The operation of the learning management system of Exemplary Embodiment 2 will be described.

Figure 18:
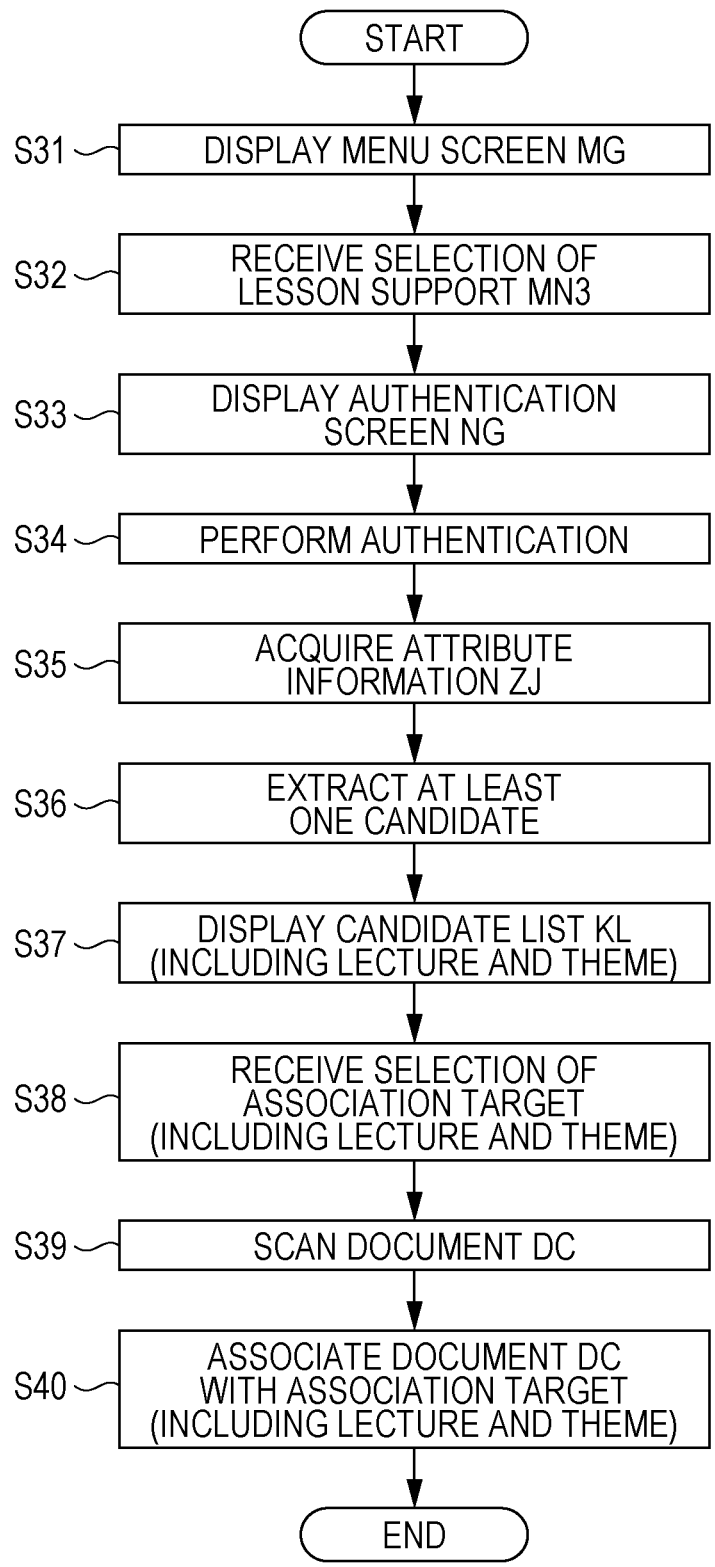
FIG. 18 is a flowchart illustrating the operation of a learning management system of Exemplary Embodiment 2.

FIG. 18 is a flowchart illustrating the operation of the learning management system of Exemplary Embodiment 2. Hereinafter, the learning management system of Exemplary Embodiment 2 will be described with reference to the flowchart in FIG. 18. The following description assumes that Ichiro Sato having the value Professor for Occupational Category as the attribute Z uses the image reading apparatus GY3 (illustrated in FIG. 1) by using the ID card CA1 (illustrated in FIG. 9) of Ichiro Sato himself and stores the document DC (illustrated in FIG. 16) of Ichiro Sato in the data folder DF (illustrated in FIG. 17) in the database unit 42 of the learning management apparatus GK.

Step S31: When Ichiro Sato touches the input unit 11 of the image reading apparatus GY3, the CPU 12 of the image reading apparatus GY3 causes the output unit 13 to display the menu screen MG (illustrated in FIG. 12), like step S11 for Exemplary Embodiment 1.

Step S32: After the menu screen MG is displayed in step S31, Ichiro Sato selects Lesson Support MN3 from the displayed menu screen MG. In the image reading apparatus GY3, the CPU 12 thus receives the selection of Lesson Support MN3, serving as the receiving unit 23.

Step S33: After receiving the selection of Lesson Support MN3 in step S32, the CPU 12 causes the output unit 13 to display the authentication screen NG (illustrated in FIG. 13).

Step S34: After the authentication screen NG is displayed in step S33, Ichiro Sato holds out the ID card CA1 (illustrated in FIG. 9) over the input unit 11 of the image reading apparatus GY3 in accordance with the message on the authentication screen NG. In the image reading apparatus GY3, the CPU 12 thus authenticates the person who intends to use the image reading apparatus GY3 as a person authorized to use the image reading apparatus GY3.

Step S35: After completing the authentication in step S34, the CPU 12 in the image reading apparatus GY3 serves as the acquisition unit 21 in the support unit SU and acquires the attribute information ZJ regarding Ichiro Sato from the ID card CA2 while the ID card CA2 is being over the input unit 11.

Step S36: After acquiring the attribute information ZJ regarding Ichiro Sato in step S35, the CPU 12 in the image reading apparatus GY3 serves as the extraction unit 22 and accesses the database DB stored in the database unit 42 in the learning management apparatus GK via the network NW. The CPU 12 thus searches all of the staff members of ABC University stored in the database DB (illustrated in FIG. 6) for a staff member having a value identical to the value A001 for ID Number as one of the attributes Z in the attribute information ZJ regarding Ichiro Sato acquired from the ID card CA1. As illustrated in FIG. 15, the CPU 12 thus extracts at least one candidate for a person to be associated with the document DC, serving as the extraction unit 22. The candidates have the values: (1) Ichiro Sato, A001, Seminar in Circuit Design, and Fundamental Knowledge about Circuit; (2) Ichiro Sato, A001, Seminar in Circuit Design, and Digital Circuit; and (3) Ichiro Sato, "A0001", Seminar in Circuit Design, and Analog Circuit.

Step S37: After extracting the above-described candidates in step S36, the CPU 12 in the image reading apparatus GY3 causes the output unit 13 to display the candidate list KL including the values of Lecture and Theme as illustrated in FIG. 15.

Step S38: After the candidate list KL is displayed in step S37, Ichiro Sato selects the candidate that is to be associated with the document DC (illustrated in FIG. 16) and that has the combination of Ichiro Sato, Seminar in Circuit Design, and Analog Circuit in (3) above from the candidate list KL by using the input unit 11. In the image reading apparatus GY3, the CPU 12 thus regards, as an association target to be associated with the document DC, the candidate having the combination of Ichiro Sato, A001, Seminar in Circuit Design, and Analog Circuit that is selected by Ichiro Sato and receives the association target, serving as the receiving unit 23.

Step S39: After the receiving of the combination of Ichiro Sato, A001, Seminar in Circuit Design, and Analog Circuit as the association target is completed in step S38, Ichiro Sato scans the document DC (illustrated in FIG. 16) with the image reading apparatus GY3. In other words, in the image reading apparatus GY3, the CPU 12 serves as the scanning unit 24 and performs a scanning operation on, that is, reads the document DC.

Step S40: After the scanning of the document DC is completed in step S39, the CPU 12 in the image reading apparatus GY3 serves as the association unit 25 and associates the combination of Ichiro Sato, A001, Seminar in Circuit Design, and Analog Circuit selected in step S38 with the document DC scanned in step S39. In more detail, as illustrated in FIG. 17, the CPU 12 stores the scanned document DC in the folder F11E-SA-1(3) for Analog Circuit immediately below the folder F11E-SA-1 for Seminar in Circuit Design immediately below the folder F11E-SA for Ichiro Sato in the data folder DF in the database unit 42 of the learning management apparatus GK.

After step S40 described above, the student who takes the class having the theme Analog Circuit of the lecture Seminar in Circuit Design provided by the professor Ichiro Sato accesses the folder F11E-SA-1(3) after submitting the document DC, for example, a homework or an examination and thereby reads the proofreading, the marking, the review, or the like of the homework submitted or the examination taken by the student themselves.

As described above, in the learning management system GKS of Exemplary Embodiment 2, the extraction unit 22 of the image reading apparatus GY3 performs the extraction by using ID Number as the attribute Z, instead of Name as the attribute Z in Exemplary Embodiment 1. In addition, as illustrated in FIG. 15, the output unit 13 of the image reading apparatus GY3 also displays the values for Lecture and Theme as the attributes Z in addition to the values for Name to Office as the attributes Z in Exemplary Embodiment 1. This makes it easier for Ichiro Sato using the image reading apparatus GY3 not only to identify Ichiro Sato from all of the staff members of ABC University like Exemplary Embodiment 1 but also, uniquely as Exemplary Embodiment 2, to narrow down the candidates to the association target having the combination of Ichiro Sato, A001, Seminar in Circuit Design, and Analog Circuit.

Modification

In the embodiments above, the term "processor" refers to hardware in a broad sense. Examples of the processor includes general processors (e.g., CPU), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

For each exemplary embodiment, an aspect in which the program PR is stored (installed) in the storage medium 14 in advance has been described; however, the aspect is not limited to this. A program may be provided in such a manner as to be recorded in a recording medium such as a compact disc read only memory (CD-ROM), a digital versatile disc read only memory (DVD-ROM), or a universal serial bus (USB) memory. The program may also be downloaded from an external apparatus via a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A document management support apparatus comprising:
    a processor configured to:
        acquire attribute information regarding a person who actually scans a paper document on behalf of a person who is to scan the paper document, the person who is to scan the paper document being a first person, the person who actually scans the paper document being a second person;
        search a plurality of candidates, and identify at least one candidate from the plurality of candidates, wherein identification of the at least one candidate is based on a determination that attribute information regarding the at least one candidate is in a predetermined relationship with the acquired attribute information regarding the second person;
        extract the identified at least one candidate for the first person from the plurality of candidates; and
        cause to output, to the first person, a candidate list including the at least one candidate.

2. The document management support apparatus according to claim 1,
    wherein the predetermined relationship varies depending on what the acquired attribute information regarding the second person represents.

3. The document management support apparatus according to claim 2,
    wherein the attribute information includes at least one of individual identification, an occupational category, belonging, charge, and an office, and
    wherein the processor extracts the candidate for the first person, the candidate having attribute information identical to the attribute information regarding the second person.

4. The document management support apparatus according to claim 2,
    wherein the attribute information includes at least individual identification, and
    wherein when the candidate for the first person has attribute information representing individual identification identical to the individual identification represented by the acquired attribute information regarding the second person, the processor regards, as the first person, the candidate having the identical individual identification.

5. An image reading apparatus comprising:
    the document management support apparatus according to claim 1;
    a scanning unit that performs a scanning operation on the paper document;
    a selection unit used for selecting the first person to be associated with the paper document scanned by using the scanning unit, the first person being selected from the at least one candidate for the first person, the at least one candidate being extracted by the document management support apparatus; and
    an association unit that associates the first person selected by using the selection unit with the paper document scanned by using the scanning unit.

6. A non-transitory computer readable medium storing a program causing a computer to execute a process for document management support, the process comprising:
    acquiring attribute information regarding a person who actually scans a paper document on behalf of a person who is to scan the paper document, the person who is to scan the paper document being a first person, the person who actually scans the paper document being a second person;
    searching a plurality of candidates, and identifying at least one candidate from the plurality of candidates, wherein identification of the at least one candidate is based on a determination that attribute information regarding the at least one candidate is in a predetermined relationship with the acquired attribute information regarding the second person;
    extracting the identified at least one candidate for the first person from the plurality of candidates; and
    causing to output, to the first person, a candidate list including the at least one candidate.

* * * * *